May 27, 1952    M. J. STEFFES    2,598,459
MASONRY DRILL
Filed Feb. 7, 1947

INVENTOR.
Milton J. Steffes.
BY
Harness, Dickey & Pierce.
ATTORNEYS.

Patented May 27, 1952

2,598,459

UNITED STATES PATENT OFFICE 2,598,459

MASONRY DRILL

Milton J. Steffes, Dearborn, Mich., assignor to Super Tool Company, Detroit, Mich., a corporation of Michigan Application February 7, 1947, Serial No. 727,027

1 Claim. (Cl. 255—61)

This invention relates to a masonry drill, and more particularly to such a drill adapted to be either manually or machine operated.

The principal objects of this invention are to provide a masonry drill having a polygonally shaped shank so that when the shank is supported in an operating chuck to drill stone, brick or the like, slippage will not occur between the shank and chuck; to provide a masonry tool having a polygonally shaped shank and a drill bit secured in one end of said shank so as to make the maximum use of the diameter of said shank and thus provide the strongest possible connection between said drill bit and shank; to provide a masonry tool having a polygonal shank and a drill bit secured in one end thereof, in which the end of said shank adjacent the drill bit is shaped in such a manner as to better reinforce said drill bit and still permit the most efficient cutting by the latter; and to provide a masonry tool which is simple in construction, inexpensive to manufacture, and efficient in operation.

These and other objects of this invention will become apparent from the following detailed description, taken in conjunction with the accompanying drawing in which.

Figure 1:
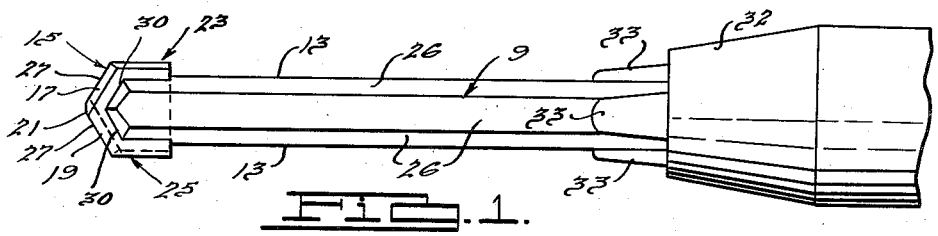
Figure 1 is a side elevational view of one embodiment of this invention.
Figure 2:
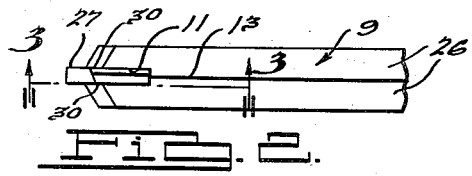
Fig. 2 is a plan view of a portion of the structure illustrated in Fig. 1.
Figure 3:
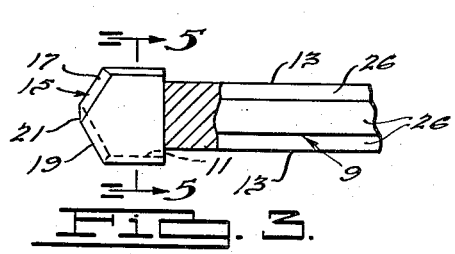
Fig. 3 is a view partially in section and partially in elevation taken along the line 3—3 of Fig. 2.
Figure 4:
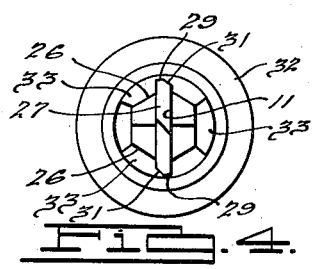
Fig. 4 is an end elevational view of the structure illustrated in Fig. 1.
Figure 5:
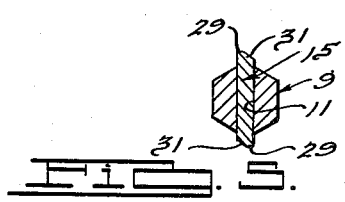
Fig. 5 is a cross-sectional view taken along the line 5—5 of Fig. 3.

Referring now to the drawing, it will be seen that the masonry drill of this invention includes a hexagon-shaped shank 9 having a shallow slot 11 at one end thereof which extends transversely across said shank through diametrically opposed apices 13 thereof. A drill bit generally indicated at 15 is positioned within the slot 11 and rigidly secured to the shank 9 by any conventional means, such as brazing, as illustrated in Fig. 1. The drill bit 15 is formed with a pair of inclined end faces 17 and 19 which intersect at the center of said bit along a diagonal edge 21 which forms the point of the drill bit. The opposite ends of each of the end faces 17 and 19 terminate at side edges 23 and 25 extending parallel to the shank 9. Each of the end faces 17 and 19 is cut back rearwardly of a cutting edge 27 at the forward edge thereof to provide conventional relief for the cutting edge.

The side edges 23 and 25 of the drill bit 15 have their forward edges, adjacent each of the cutting edges 27, dubbed off as at 29 in a conventional manner, so as to prevent breaking thereof and eliminate rapid wearing which would vary the diameter of the hole to be drilled. Rearwardly of the dubbed portion 29 each of the side edges 23 and 25 is cut back as at 31 to provide conventional side clearance therefor.

The ends 30 of the flat sides 26 of the shank 9, adjacent the end faces of the drill bit 15, are cut parallel to the end faces of the drill bit and relieved rearwardly at an angle similar to the relief angle of the end faces. It will be noted that the forward abutting edge of each flat side 26 is spaced from its respective edge of each of the end faces, a distance equal to the width of the end faces, so as to abut both the cutting faces and opposite faces of the drill bit.

The opposite end of the shank 9, from the drill bit 15, is adapted to be engaged in any conventional chuck, for a hand motor, machine, or the like, but in the embodiment illustrated in the drawing is shown engaged in a three-jawed chuck 32. As can be seen in Fig. 1, the three jaws 33 engage three of the opposed flat sides 26 of the shank 9 so as to prevent, or greatly reduce, any slippage which may occur between the jaws 33 and the shank when the tool is in operation, such as often occurs when a cylindrical type shank is employed.

Figure 6:
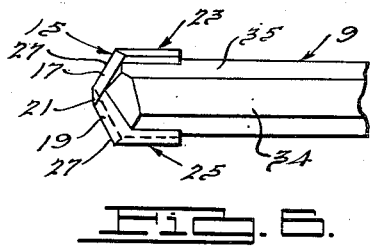
Fig. 6 is a side elevational view of a further embodiment of this invention.
Figure 7:
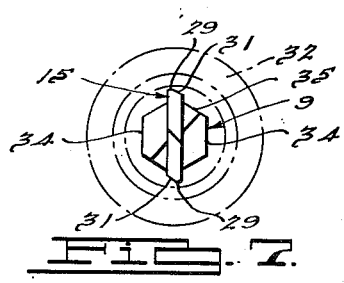
Fig. 7 is a view in end elevation of the structure illustrated in Fig. 6.

In the embodiment illustrated in Figs. 6 and 7, the drill bit 15 is identical with the drill bit previously described and the shank 9 is of the same shape. However, in the embodiment illustrated in Figs. 6 and 7 the end portions of the shank 9 adjacent the drill bit are cut and formed in a different manner than in the embodiment previously described. The flat sides 34 of the shank 9 which are adjacent to the cutting edge 27 of each of the end faces 17 and 19, that is the flat sides which abut the cutting face on each side of the tool, are shaped and located in a manner similar to the flat side ends 30 previously described. However, the ends of the flat sides 35, which abut the opposite face from the cutting face on each side of the drill bit, are positioned so as to be flush with the rear edge of each end face 17 and 19 and are relieved at the same angle as the end faces so as to provide reinforcing extensions therefor so as to give greater support to said drill bit.

It will therefore be seen that a masonry tool is provided which eliminates the common difficulty now prevalent wherein slippage occurs between the operating chuck and the shank of the tool, and which is provided with a drill bit which will cut with the maximum of efficiency and which is less liable to break or cause breakage of the shank end adjacent to the drill bit. Likewise, the drill shank, while shown as of a hexagonal shape, may be of any polygonal shape, the flat sides providing clearance for the discharge of loosened particles upwardly along the shank and out of the hole as it is being drilled. This is a decided advantage over a cylinder shank which rotates within the collection of particles without disturbing and causing them to rise from the hole.

I claim:

A drill including a hexagonal rod engageable by a driving tool at one end and having a slot in the opposite end extending through apices at diametrically opposite sides of the rod, and a bit secured in said wall of a width substantially wider than the dimension across the apices of said rod so as to extend therebeyond, the top and side edges of the bit being relieved in opposite directions on opposite sides of the center thereof, the end of the bit sloping from the center to the sides with the meeting line at the center disposed angularly, with the center of the line located on the center of the bit.

MILTON J. STEFFES.

REFERENCES CITED

The following references are of record in the file of this patent:

UNITED STATES PATENTS

| Number | Name | Date |
|---|---|---|
| 994,668 | Childs | June 6, 1911 |
| 1,516,601 | Hawkesworth | Nov. 25, 1924 |

FOREIGN PATENTS

| Number | Country | Date |
|---|---|---|
| 363,913 | Great Britain | Dec. 31, 1931 |
| 375,596 | Great Britain | June 30, 1932 |
| 409,385 | Great Britain | Apr. 30, 1934 |
| 600,276 | Germany | July 20, 1934 |